Patented Sept. 19, 1944

2,358,716

UNITED STATES PATENT OFFICE 2,358,716

THIAZOLES

Paul C. Jones and Arthur W. Sloan, Akron, Ohio, assignors to The B. F. Goodrich Company, New York, N. Y., a corporation of New York No Drawing. Original application April 5, 1939, Serial No. 266,130. Divided and this application September 22, 1942, Serial No. 459,294

8 Claims. (Cl. 260—302)

This invention has as its object the preparation of a new class of compounds useful as vulcanization accelerators.

We have discovered that bis-mercaptomethyl amines having the general formula $$[(R-S-A-)_2N]_nY$$

wherein R represents an organic radical with the free valence on a carbon atom, A represents an alkylene group, Y represents a hydrocarbon radical with a valence not greater than two and $n$ is equal to the valence of Y, are easily prepared and are excellent accelerators of vulcanization.

These compounds fall into two general classes, namely, the bis-mercaptomethyl amines derived from amines containing one primary amino group such as ethylamine or aniline, and the bis-mercaptomethyl amines derived from polyamines such as ethylene diamine or p-phenylene diamine.

The preferred compounds derived from monoamines have the general formula $$(R-S-CH_2-)_2N-Y$$

wherein R represents an organic radical with the free valence on a carbon atom and Y represents a monovalent hydrocarbon group.

These compounds may be considered as being derived from sulfhydryl (R—SH) compounds, and may be conveniently grouped according to the sulfhydryls to which they are related.

When the compounds are derived from mercaptans, R represents methyl, ethyl, isopropyl, allyl, cyclohexyl, benzyl, ortho, meta, or para tolyl, naphthyl, anthryl, indanyl, chlorphenyl, methoxyethyl, anisyl, anilinophenyl, furyl, etc. Such specific compounds as

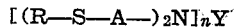

bis-phenylmercaptomethyl ethyl amine, bis-beta-naphthylmercaptomethyl ethyl amine, and related compounds fall within this class.

Other members of this new class of compounds may be considered as derived from carbothiolic and carbodithioic acids, in which case R represents such groups as methanecarbothionyl, ethanecarbothionyl, benzenecarbothionyl, 3-furanecarbothionyl, acetyl, 3-furoyl, and related groups. Such specific compounds as

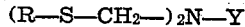

bis - benzenecarbothionylmercaptomethyl ethyl amine and bis-acetylmercaptomethyl ethyl amine are typical compounds of this type.

R may also be derived from a dithiocarbamic acid and represent such groups as dimethylthiocarbamyl, methyl-ethyl-thiocarbamyl, ethyl-thiocarbamyl, methyl-phenyl-thiocarbamyl, ethyl-benzyl-thiocarbamyl, diphenylthiocarbamyl, phenyl-alpha-naphthyl-thiocarbamyl, phenyl-para-chlorphenyl-thiocarbamyl, o,o'-dimethyl-methylenediphenylthiocarbamyl, phenyl-para-isopropylphenyl-thiocarbamyl, phenyl-para-hydroxyphenyl-thiocarbamyl, p h e n y l - anilinophenyl-thiocarbamyl and similar groups. The diaryldithiocarbamic derivatives, of which

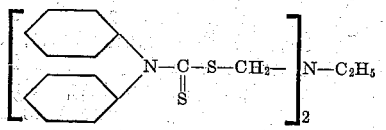

bis-diphenylthiocarbamylmercaptomethyl ethyl amine, is a typical member, are preferred.

Other members of this new class of compounds may be considered as derived from azoles, azines, and azolines. In this case, R represents such groups as 2-thiazyl, 2-benzothiazyl, 2-naphthothiazyl, 2-benzooxazyl, 2-benzoimidazyl, 4,5-dimethyl-2-thiazyl, 4-methyl-5-ethyl-2-thiazyl, 2-thiazolinyl, 4,5-dimethyl-2-thiazolinyl, and similar oxazine and thiazine derivatives. Preferred compounds in this class include

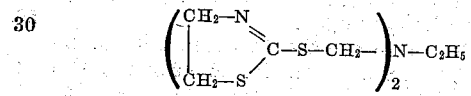

bis-2-thiazolinylmercaptomethyl ethyl amine, bis-2-benzothiazylmercaptomethyl ethyl amine, 2-benzothiazylmercaptomethyl 2-thiazolinylmercaptomethyl ethyl amine, bis-2-(4,5-dimethyl-thiazyl) mercaptomethyl ethyl amine and like derivatives of other thiazolines and alkyl and arylene thiazoles.

It is to be understood Y is not restricted to ethyl, but may be methyl, isopropyl, vinyl, cyclohexyl, benzyl, phenyl, xenyl, naphthyl, and other univalent hydrocarbon groups. Although the bis-mercaptomethyl amines are preferred, bis-mercaptoethyl amines or compounds in which A represents other alkylene groups are within the broad scope of the invention.

The second class of compounds, formed where Y is divalent, are derived from diamines. The preferred compounds have the general formula

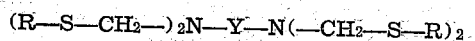

wherein R represents an organic radical with a free valence on a carbon atom and Y represents a divalent hydrocarbon group. R may represent the wide variety of radicals heretofore described, and Y may represent ethylene, propylene, phenylene, naphthylene, xenylene, cyclohexylene, and similar alkylene and arylene groups. Typical accelerators within this class comprise

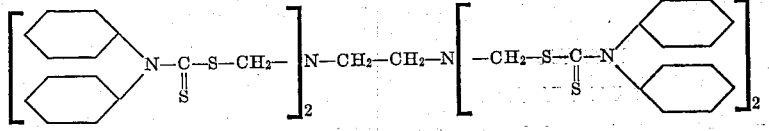

N,N,N',N'-tetrakis-diphenylthiocarbamylmercaptomethyl-ethylenediamine,
N,N,N',N' - tetrakis - 2 - benzothiazylmercaptomethyl ethylenediamine,
N,N,N',N'-tetrakis-2-(4,5-dimethylthiazyl) mercaptomethyl ethylenediamine,
N,N,N',N' - tetrakis-2-thiazolinylmercaptomethyl ethylenediamine, etc The compounds of this invention may in general be prepared by reacting, in proper proportions, a metallic salt of a sulfhydryl compound with an aldehyde and a primary amine salt in accordance with the following equation:

2R—SNa+2CH$_2$+2YNH$_2$·HCl→
  (R—S—CH$_2$—)$_2$N—Y—+YNH$_2$+2NaCl+2H$_2$O

These reagents interact when brought into contact, even at room temperature, although they may be warmed somewhat if desired; and are preferably reacted in a liquid medium such as water, alcohol, acetone, benzene or the like.

Certain sulfhydryl compounds such as the thiazoles and thiazolines undergo an addition reaction with formaldehyde to form thioalkylenehydrins which are useful reactants for the preparation of the compounds of this invention in accordance with the following equation:

2R—S—CH$_2$OH+YNH$_2$→
  (R—S—CH$_2$—)$_2$N—Y+2H$_2$O

Detailed instructions for carrying out reactions of these types are disclosed in the prior patents of Coleman No. 1,901,582 and Bunbury et al. No. 1,972,918. Other methods of preparation which will be apparent to those skilled in the art may be employed, the preferred method being ordinarily determined by the sulfhydryl compound to be employed.

In order to more clearly illustrate our invention, and the preferred modes of carrying the same into effect, the following examples are given:

*Example I*

Bis-diphenylthiocarbamylmercaptomethyl ethyl amine was prepared by the reaction represented stoichiometrically as follows:

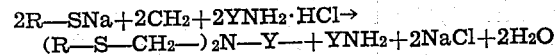

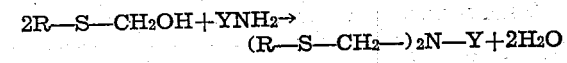

2NaCl+C$_2$H$_5$NH$_2$+2H$_2$O

The ingredients were dissolved in water and mixed, whereupon a white precipitate formed, which was filtered off and dried.

When 0.5 part by weight of this accelerator was incorporated in a composition containing rubber 100 parts, zinc oxide 5 parts, sulfur 3 parts, and stearic acid 1 part, the composition attained a tensile strength of 2395 lbs./in.$^2$ when heated in a press for 60 min. at 220° F., and a tensile strength of 3410 lbs./in.$^2$ when heated for 15 min. at 287° F.

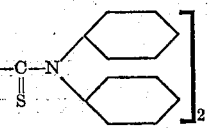

*Example II*

Bis-2-benzothiazylmercaptomethyl cyclohexyl amine was prepared by the following stoichiometric reaction:

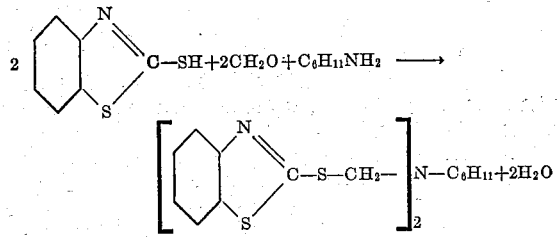

The materials were dissolved in a small volume of acetone, and a precipitate gradually formed and was isolated by evaporating the acetone and water.

A composition containing rubber 100 parts by weight, sulfur 3.5 parts, zinc oxide 5 parts, lauric acid 3 parts, and the above accelerator 1 part, developed a tensile strength of 3870 lbs./in.$^2$ when cured in a heated mold for 15 min. at 287° F.

*Example III*

Bis-2-thiazolinylmercaptomethyl cyclohexyl amine was prepared by the following stoichiometric reaction:

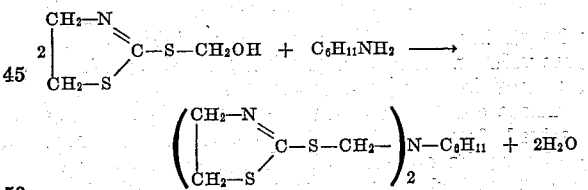

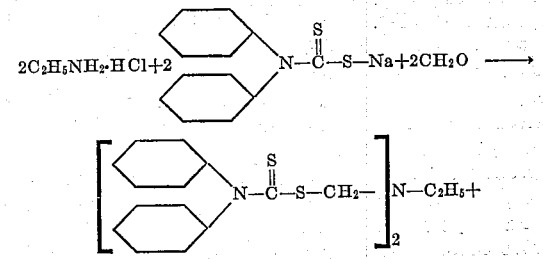

The reaction occurs on simple mixing of the materials, with considerable evolution of heat, and may be completed by further heating, which also removes water from the product.

A composition containing rubber 100 parts by weight, sulfur 3.5 parts, zinc oxide 5 parts, and the above accelerator 1 part exhibited the following characteristics when vulcanized in a heated mold:

| Time of cure in min. at 287° F. | Tensile strength | Elongation |
|---|---|---|
|  | Lbs./in.$^2$ | Per cent |
| 15 | 3,770 | 840 |
| 30 | 3,570 | 760 |

When 3 parts of lauric acid were included in the above recipe, the following results were obtained:

| Time of cure in min. at 287° F. | Tensile strength | Elongation |
|---|---|---|
|  | Lbs./in.$^2$ | Per cent |
| 15 | 4,010 | 760 |
| 30 | 4,250 | 710 |

This invention is not limited to the specific examples herein set forth, for it will be obvious to those skilled in the art that many modifications such as using other materials having equivalent properties and varying the proportions of materials used are within the spirit and scope of the invention as defined in the appended claims.

This is a division of our copending application Serial No. 266,130 filed April 5, 1939.

We claim:

1. A compound having the formula $$[(R-S-CH_2-)_2N]_nY$$

wherein R represents an organic radical with the free valence on a carbon atom, Y represents a hydrocarbon radical with a valence not greater than two and $n$ is equal to the valence of Y.

2. A compound having the formula $$(R-S-CH_2-)_2N-Y$$

wherein R represents an organic radical with the free valence on a carbon atom and Y represents a monovalent hydrocarbon radical.

3. A compound having the formula $$(R-S-CH_2-)_2N-Y$$

wherein R represents a 2-thiazyl radical and Y represents a saturated monovalent hydrocarbon radical.

4. Bis-2-benzothiazylmercaptomethyl cyclohexyl amine.

5. A compound having the formula $$(R-S-CH_2-)_2N-Y$$

wherein R represents a 2-thiazolinyl radical and Y represents a saturated monovalent hydrocarbon radical.

6. Bis-2-thiazolinylmercaptomethyl cyclohexyl amine.

7. A compound having the formula $$[(R-S-CH_2-)_2N]_2Y$$

wherein R represents an organic radical with the free valence on a carbon atom and Y represents a divalent hydrocarbon radical.

8. N,N,N',N'- tetrakis - 2 - thiazolinylmercaptomethyl ethylene diamine.

PAUL C. JONES.
ARTHUR W. SLOAN.